(12) United States Patent
Dong et al.

(10) Patent No.: US 7,769,259 B1
(45) Date of Patent: Aug. 3, 2010

(54) OPTICAL COUPLER AT INTERFACE BETWEEN LIGHT SENSOR AND WAVEGUIDE

(75) Inventors: Po Dong, Arcadia, CA (US); Dazeng Feng, Arcadia, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 12/291,003

(22) Filed: Nov. 5, 2008

(51) Int. Cl.
G02B 6/26 (2006.01)

(52) U.S. Cl. .......................... 385/39; 385/147

(58) Field of Classification Search ............. 385/14–15, 385/39–48
See application file for complete search history.

(56) References Cited

U.S. PATENT DOCUMENTS

| | | | |
|---|---|---|---|
| 4,784,452 A * | 11/1988 | Hodge et al. | 385/48 |
| 5,159,700 A * | 10/1992 | Reid et al. | 385/14 |
| 6,924,510 B2 * | 8/2005 | Gardner et al. | 257/79 |
| 7,308,166 B1 * | 12/2007 | Peng et al. | 385/14 |
| 2002/0191916 A1 * | 12/2002 | Frish et al. | 385/43 |

OTHER PUBLICATIONS

Jutzi et al., *Ge-on-So vertical incidence Photodiodes with 39-GHz Bandwidth*, IEEE Photonics TechnologyLetters, vol. 17, No. 7, Jul. 2005 (pp. 1510-1512).

Liu et al., *Tensile strained Ge p-I-n photodetectors on Si platform for C and L band telecommunications*, Appl. Phys. Lett. 87, 011110 (2005) (pp. 1-3).

Rouviere et al., *Integration of germanium waveguide photodetectors for intrachip optical interconnects*, Optical Engineering 44(7), 075402 (Jul. 2005) (pp. 1-5).

Vivien et al., *High speed and high responsivity germanium photodetector integrated in a Silicon-On-Insulator microwaveguide*, Jul. 23, 2007/ vol. 15, No. 15/Optics Express (pp. 9843-9845).

Yin et al., *31GHz Ge n-I-p. waveguide photodetectors on Sililcon-on-Insulator substrate*, Oct. 17, 2007/Vpl. 15, No. 21/Optics Express (pp. 13965-13971).

* cited by examiner

*Primary Examiner*—Akm E Ullah
(74) *Attorney, Agent, or Firm*—Gavrilovich, Dodd & Lindsey, LLP

(57) ABSTRACT

A method of operating an optical device includes inserting a light signal into a waveguide positioned on a base. A light sensor is positioned on the base and is configured to receive the light signal after the light signal exits from the waveguide. The method also includes elevating the light signal relative to the base before the light signal enters the light sensor. The light signal is elevated such that the light signal enters the light-absorbing medium in a position that is elevated above the position where the light signal would enter the light-absorbing medium if the light-absorbing medium received the entire light signal directly from the waveguide.

15 Claims, 4 Drawing Sheets

OPTICAL COUPLER AT INTERFACE BETWEEN LIGHT SENSOR AND WAVEGUIDE

FIELD

The present invention relates to optical devices and more particularly to devices having an interface between a light sensor and an optical waveguide.

BACKGROUND

The use of optical and/or optoelectronic devices is increasing in communications applications. These device often include light sensors that receive light signals from a waveguide. These light sensors often employ a light absorbing material that absorbs light signals. During operation of the light sensor, an electrical field is present across the light absorbing material. When the light absorbing material absorbs a light signal, an electrical current flows through the light absorbing material. As a result, the level of electrical current through the light absorbing material indicates the intensity of light signals being received by the light absorbing material.

These waveguides that are present on optical and/or optoelectronic devices are often made of silicon. Because silicon does not absorb the light signals having the wavelengths that are used in communications applications, silicon is often not effective for use as the light absorbing medium in the light sensors for communications application. In contrast, germanium is a material that can absorb these light signals and is accordingly often used as the light absorbing medium in the light sensors for communications application. However, the use of germanium in combination with silicon waveguides can be associated with undesirably high levels of dark current. Dark current is the flow of electrical current through the light sensor when the light sensor is not receiving light signals. As a result, dark current is a source of noise for these light sensors.

For the above reasons, there is a need for an improved interface between waveguides and light sensors.

SUMMARY

An example of one embodiment of the optical device includes a waveguide on a base. The waveguide is configured to guide a light signal through a light-transmitting medium. The waveguide has a coupled portion and an uncoupled portion. An optical coupler is positioned on the coupled portion but not on the uncoupled portion of the waveguide. The coupled portion of the waveguide is between the optical coupler and the base. The optical coupler is configured such that at least a portion of the light signal enters the optical coupler from the waveguide. A light sensor is positioned on the base with the light-transmitting medium being between the light sensor and the base. The light sensor includes a light-absorbing medium configured to receive at least a portion of the light signal from the optical coupler. The light-absorbing medium is different from the light-transmitting medium.

A method of operating an optical device includes inserting a light signal into a waveguide positioned on a base. A light sensor is positioned on the base and is configured to receive the light signal after the light signal exits from the waveguide. The method also includes elevating the light signal relative to the base before the light signal enters the light sensor. The light signal is elevated such that the light signal enters the light-absorbing medium in a position that is elevated above the position where the light signal would enter the light-absorbing medium if the light-absorbing medium received the entire light signal directly from the waveguide.

BRIEF DESCRIPTION OF THE FIGURES

FIG. 1A is a topview of the device.

FIG. 1B is a cross-section of the device shown in FIG. 1A taken along the line labeled B.

FIG. 1C is a cross-section of the device shown in FIG. 1B taken along the line labeled C.

FIG. 1D is a cross-section of the optical device taken along a longitudinal axis of the waveguide. The cross-section illustrates the relationships between the light-transmitting medium, the optical coupler and the light-absorbing medium of the light sensor.

FIG. 3A is a perspective view of a light sensor positioned on the optical device.

FIG. 3B is a cross-section of the light sensor shown in FIG. 3A taken along the line labeled C in FIG. 3A.

DESCRIPTION

The optical device includes a light transmitting medium on a base. The device also includes a waveguide configured to guide a light signal through the light-transmitting medium. The optical device also includes a light sensor configured to receive the light signal from the waveguide. The light sensor includes a light-absorbing medium positioned such that a seed portion of the light-transmitting medium is between the light-absorbing medium and the base.

The waveguide includes a coupled region and uncoupled region. An optical coupler is positioned on the coupled region of the waveguide but not on the uncoupled region of the waveguide. The optical coupler is configured such that at least a portion of the light signal enters the optical coupler from the coupled portion of the waveguide. The portion of the light signal that enters the optical coupler is the coupled portion of the light signal. The entry of the coupled portion into the optical coupler elevates the light signal relative to the base.

The light-absorbing medium receives at least the coupled portion of the light signal from the optical coupler. Since the optical coupler elevates the light signal relative to the base before the light signal enters the light-absorbing medium, the light signal enters the light-absorbing medium in a position that is elevated above the position where the light signal would enter the light-absorbing medium if the coupler were not present. The elevation of the light signal in the light-absorbing medium moves the light signal away from the seed portion of the light-transmitting medium. Interaction of the light signal with the seed portion of the light-transmitting medium is a source of dark current. As a result, movement of the light signal away from the seed portion of the light-transmitting medium, reduces the dark current associated with the light sensor.

Figure 1A:
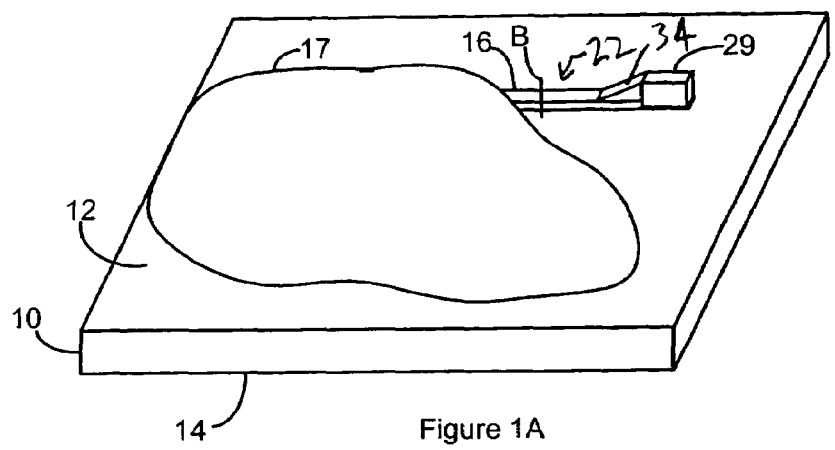
FIG. 1A through FIG. 1D illustrate an optical device. The optical device includes an optical coupler positioned at the interface of a waveguide and a light sensor. The waveguide is defined in a light-transmitting medium that is positioned on a base. A portion of the light-transmitting medium is also positioned between the base and the light sensor.
Figure 1B:
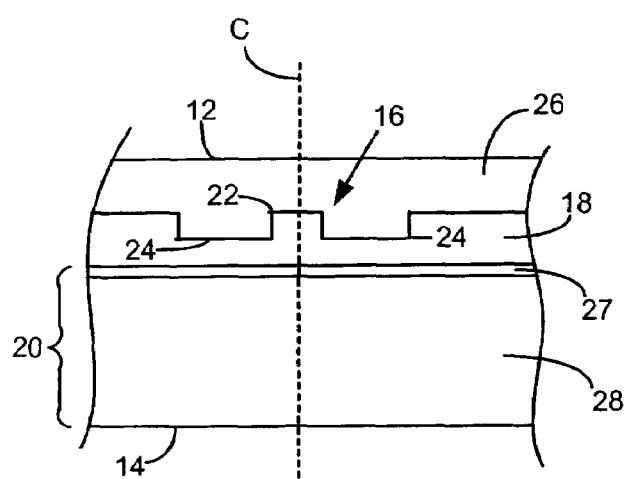
Figure 1C:
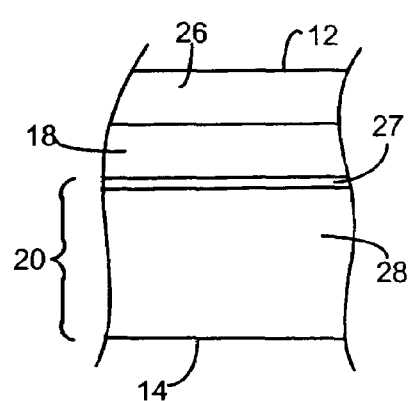
Figure 1D:
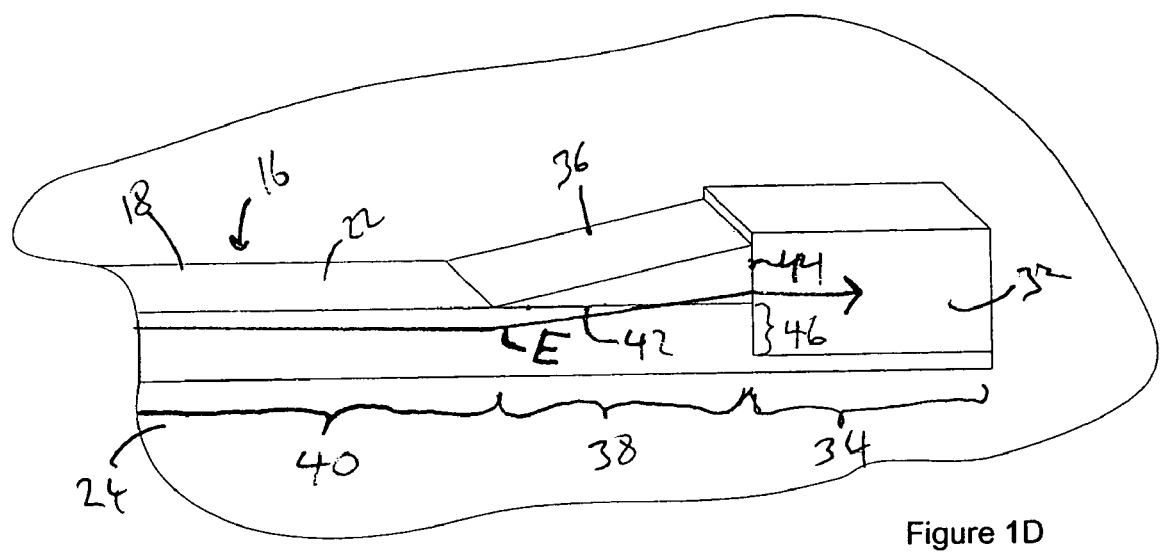

FIG. 1A through FIG. 1D illustrate an optical device. FIG. 1A is a topview of the device. FIG. 1B is a cross-section of the device shown in FIG. 1A taken along the line labeled B. FIG. 1C is a cross-section of the device shown in FIG. 1B taken along the line labeled C. FIG. 1D is a cross-section of the optical device taken through the longitudinal axis of the waveguide on the device.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extend through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers 36, optical switches, lasers that act a source of a light signal, amplifiers for amplifying the intensity of a light signal, attenuators for attenuating the intensity of a light signal, modulators for modulating a signal onto a light signal, light sensors 29 that convert an light signal to an electrical signal, and vias that provide an optical pathway for a light signal traveling through the device from the bottom side 14 of the device to the top side 12 of the device. Additionally, the device can optionally include electrical components. For instance, the device can include electrical connections for applying a potential or current to a waveguide and/or for controlling other components on the optical device.

The waveguide 16 is defined in a light-transmitting medium 18 positioned on a base 20. The light-transmitting medium 18 includes a ridge 22 defined by trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. A fourth light-transmitting medium 26 is optionally positioned on the light-light transmitting medium. The fourth light-transmitting medium 26 can serve as a cladding for the waveguide 16 and/or for the device. When the light-transmitting medium 18 is silicon, suitable fourth light-transmitting media 26 include, but are not limited to, silicon, polymers, silica, SiN, GaAs, InP and LiNbO$_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 27 with a lower index of refraction than the light-transmitting medium 18. The drop in the index of refraction can cause reflection of a light signal from the light-transmitting medium 18 back into the light-transmitting medium 18. The base 20 can include the optical insulator 27 positioned on a substrate 28. As will become evident below, the substrate 28 can be configured to transmit light signals. For instance, the substrate 28 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 27 and the silicon substrate can serve as the substrate 28.

The optical device also includes a light sensor 29 configured to receive a light signal guided by the one or more waveguides 16. The light sensor 29 is configured to convert the light signal to an electrical signal. Accordingly, the light signal can be employed to detect receipt of light signals. For instance, the light sensor 29 can be employed to measure the intensity of a light signal and/or power of a light signal. Although FIG. 1 illustrates a waveguide 16 carrying the light signal between the one or more components and the light sensor 29, the device can be constructed such that the waveguide 16 carries the light signal directly from an optical fiber to the light sensor 29.

A suitable light sensor 29 includes a light-absorbing medium 32 that absorbs light signals. During operation of the light sensor 29, an electrical field is applied across the light-absorbing medium 32. When the light-absorbing medium 32 absorbs a light signal, an electrical current flows through the light-absorbing medium 32. As a result, the level of electrical current through the light-absorbing medium 32 indicates receipt of a light signal. Additionally, the magnitude of the current can indicate the power and/or intensity of the light signal. Different light-absorbing medium 32 can absorb different wavelengths and are accordingly suitable for use in a sensor 29 depending on the function of the sensor 29. A light-absorbing medium 32 that is suitable for detection of light signals used in communications applications include, but are not limited to, germanium, silicon germanium, silicon germanium quantum well, GaAs, and InP. Germanium is suitable for detection of light signals having wavelengths in a range of 1300 nm to 1600 nm.

The light-absorbing medium 32 of the light sensor 29 is positioned on a seed portion 34 of the light-transmitting medium 18. The seed portion 34 of the light-transmitting medium 18 can be continuous with the light-transmitting medium 18 included in the waveguide 16 or spaced apart from the waveguide 16. During the fabrication of the device, the seed portion 34 of the light-transmitting medium 18 can be used to grow the light-absorbing medium 32. For instance, when the light-transmitting medium 18 is silicon and the light-absorbing medium 32 is germanium, the germanium can be grown on the silicon. As a result, the use of the light-transmitting medium 18 in both the waveguides 16 and as a seed layer for growth of the light-absorbing medium 32 can simplify the process for fabricating the device.

The device includes an optical coupler 36 at the interface of the light-absorbing medium 32 and waveguide 16. The optical coupler 36 is positioned on the waveguide 16 such that the waveguide 16 is positioned between the base 20 and the optical coupler 36. The optical coupler 36 is positioned on a coupled portion 38 of the waveguide 16 but is not positioned on an uncoupled portion 40 of the waveguide 16. The optical coupler 36 can be positioned such that the waveguide 16 is between the optical coupler 36 and the base 20.

The optical coupler 36 can include or consist of a coupler medium through which the light signal travels. The coupler medium can be in contact with the light-transmitting medium 18. For instance, the entry facet 42 of the optical coupler 36 can contact the light-transmitting medium 18 as illustrated in FIG. 1D. Alternately, there can be one or more layers of medium between the entry facet 42 of the optical coupler 36 and the light-transmitting medium 18. The one or more layers can include or consist of one or more layers of anti-reflective coating and/or one or more layers of index matching medium.

The coupler medium can contact the light-absorbing medium 32. For instance, an exit facet 44 of the optical coupler 36 can contact the light-absorbing medium 32 as illustrated in FIG. 1D. Alternately, there can be one or more layers of medium between the exit facet 44 of the optical coupler 36 and the light-absorbing medium 32. The one or more layers can include or consist of one or more layers of anti-reflective coating and/or one or more layers of index matching medium.

The optical coupler 36 is configured such that a coupled portion 38 of a light signal enters the optical coupler 36 from the waveguide 16. For instance, a coupled portion 38 of the light signal enters the optical coupler 36 through the entry facet 42. The coupled portion 38 of the light signal can include all of the light signal traveling along the uncoupled portion 40 of the waveguide 16 or a portion of the light signal traveling along the uncoupled portion 40 of the waveguide 16.

The optical coupler 36 is also configured such that the coupled portion 38 of the light signal exits from the optical coupler 36. The optical coupler 36 is positioned such that the light-absorbing medium 32 receives at least the coupled portion 38 of the light signal from the optical coupler 36. The optical coupler 36 can be configured such that an coupled portion 38 of the light signal remains in the waveguide 16. As a result, the light signal can exit from both the exit facet 44 of the optical coupler 36 and a waveguide facet 46. The light-absorbing medium 32 can be positioned to receive the coupled portion 38 of the light signal that exits from the exit face of the optical coupler 36 and the uncoupled portion 38 of the light signal that exits from the waveguide facet 46.

The optical coupler 36 is configured such that the entry of the coupled portion 38 into the optical coupler 36 elevates the light signal relative to the base 20 as is evident from the arrow labeled E. For instance, the position of the optical coupler 36 over the waveguide 16 combined with the entry of the coupled portion 38 of the light signal into the optical coupler 36 elevates the light signal. Since the optical coupler 36 elevates the light signal relative to the base 20 before the light signal enters the light-absorbing medium 32, the light signal enters the light-absorbing medium 32 in a position that is elevated above the position where the light signal would enter the light-absorbing medium 32 if the coupler were not present. As is evident from the arrow labeled E, the elevation of the light signal in the light-absorbing medium 32 reduces the interaction of the light signal with the seed portion 34 of the light-transmitting medium 18.

The coupler medium includes a vertical taper. The vertical taper can be an adiabatic taper to reduce excitation of higher order modes before the light signal enters the light-absorbing medium 32. The use of an adiabatic taper may be desirable when the waveguide 16 is a single mode waveguide 16 and may be less desirable when the waveguide 16 is a multi-mode waveguide 16.

The elevated position of the light signal in the light-absorbing medium 32 moves the light signal away from the seed portion 34 of the light-transmitting medium 18. The interaction of the light signal with the seed portion 34 of the light-transmitting medium 18 is a source of dark current in the light sensor 29. As a result, the movement of the light signal away from the seed portion 34 of the light-transmitting medium 18 reduces the dark current associated with the light sensor 29.

Figure 2A:
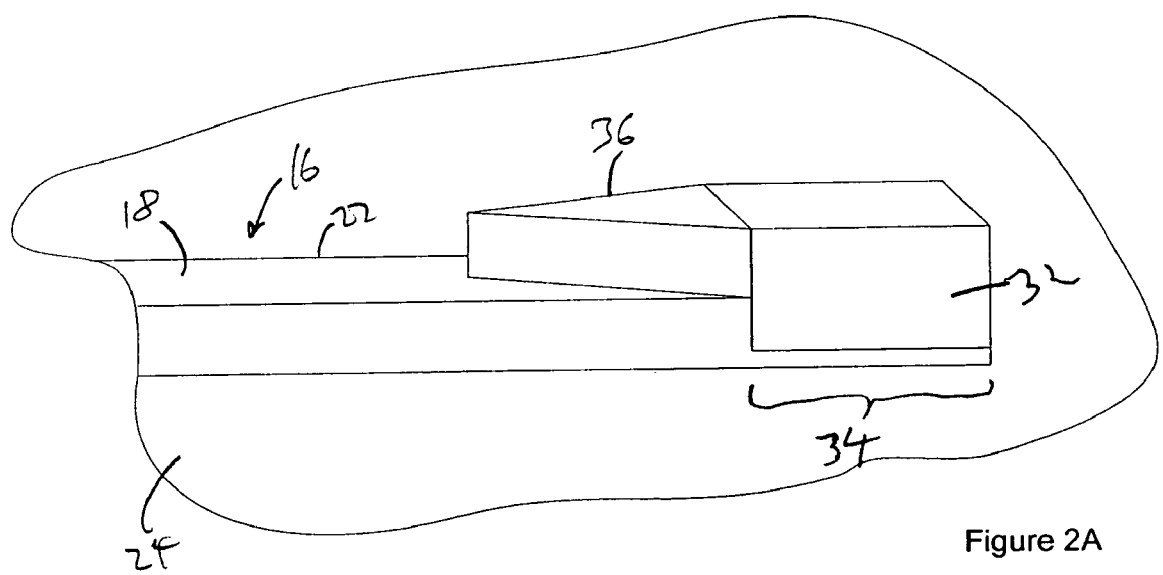
FIG. 2A is a perspective view of a portion of an optical device having an optical coupler with a horizontal taper.

The coupler medium can include a horizontal taper as illustrated in FIG. 2A. The horizontal taper is also constructed to elevate the light signal relative to the base 20 as is evident from the arrow labeled E.

Although not illustrated, the coupler medium can include both a horizontal taper and a vertical taper.

Figure 2B:
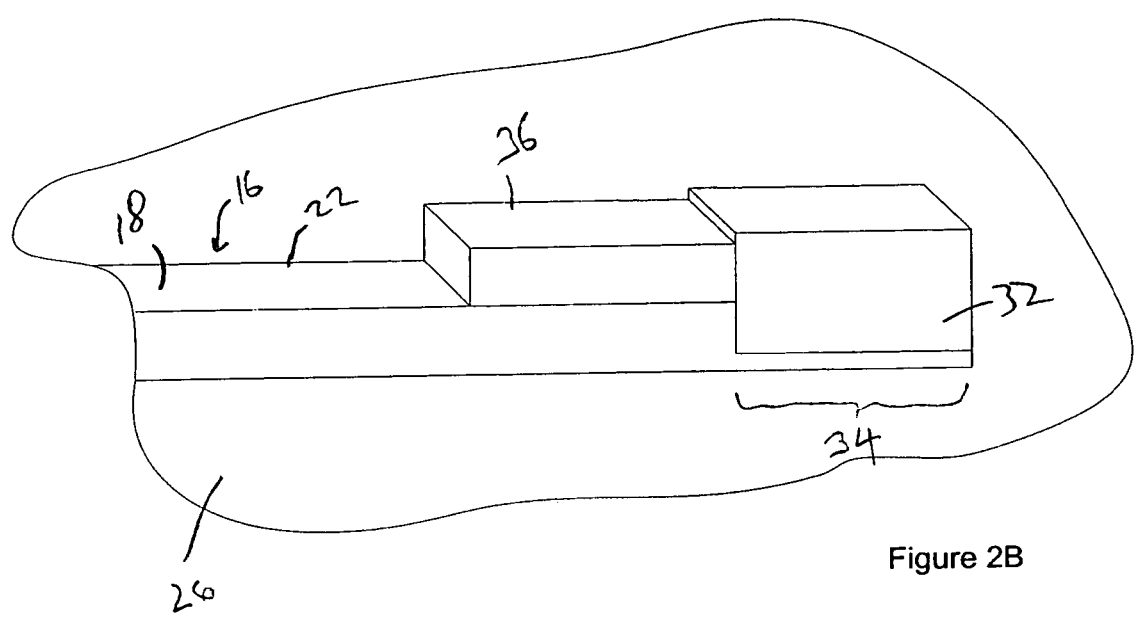
FIG. 2B is a perspective view of a portion of an optical device having a multi-mode interference device (MMI) that serves as the optical coupler.

The coupler medium can be a multi-mode interference device (MMI) as shown in FIG. 2B. The multi-mode interference device can cause excitation of higher order modes. When the waveguide 16 is a single mode waveguide, the portion of the light signal that is coupled into the multi-mode interference device increases as the length of the multi-mode interference device increases. In some instances, the multi-mode interference device (MMI) is long enough for the entire light signal to be coupled into the multi-mode interference device. As a result, the multi-mode interference device (MMI) can elevate the entire light signal relative to the base 20. A suitable multi-mode interference device (MMI) can exclude tapers and can have six sides that are each substantially rectangular.

FIG. 1A through FIG. 2B illustrate the optical coupler 36 and the waveguide 16 as different pieces of the device. As a result, there is an interface between the light-transmitting medium 18 and the coupler medium. For instance, the interface can be an interface according to the growth of the coupler medium on the light-transmitting medium 18 or depositing the coupler medium on the light-transmitting medium 18.

The coupler medium can be the same as the light-transmitting medium 18 or different from the light-transmitting medium 18. In some instances, the coupler medium has an index of refraction that is greater than or equal to an index of refraction of the light-transmitting medium 18. In an example, the optical coupler 36 includes or consists of crystal silicon or amorphous silicon and the light-transmitting medium 18 includes or consists of crystal silicon.

Figure 3A:
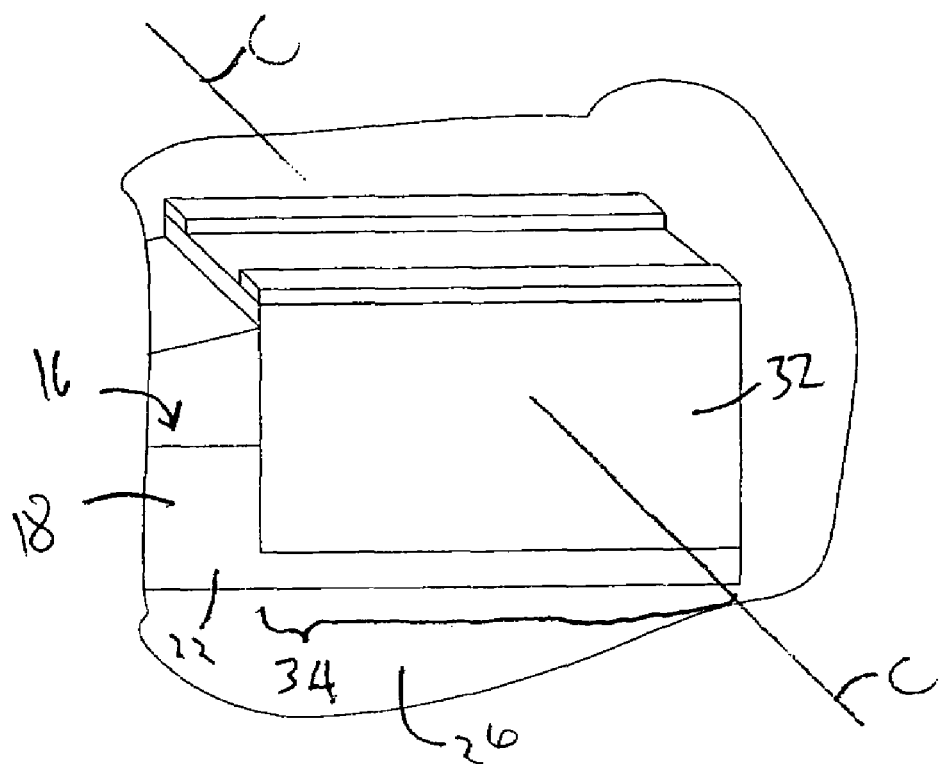
FIG. 3A and FIG. 3B illustrate an example construction of a light sensor.
Figure 3B:
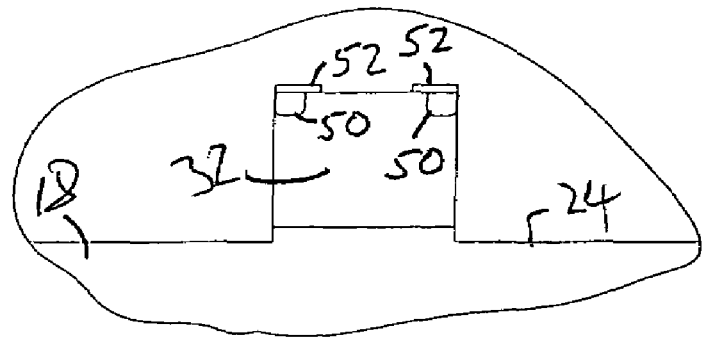

FIG. 3A and FIG. 3B illustrate an example construction of a light sensor 29. FIG. 3A is a perspective view of a light sensor 29 positioned on the optical device. FIG. 3B is a cross-section of the light sensor 29 shown in FIG. 3A taken along the line labeled C in FIG. 3A.

As discussed above, the light sensor 29 includes a light-absorbing medium 32. The light-absorbing medium 32 includes doped regions 50. Each of the doped regions 50 can be an N-type doped regions 50 or a P-type doped region 50. For instance, each of the N-type doped regions 50 can include an N-type dopant and each of the P-type doped regions 50 can include a P-type dopant.

In some instances, the light-absorbing medium 32 includes a doped region 50 that is an N-type doped region 50 and the doped region 50 that is a P-type doped region 50. The separation between the doped regions 50 in the light-absorbing medium 32 results in the formation of PIN (p-type region-insulator-n-type region) junction in the light sensor 29.

Suitable dopants for N-type regions include, but are not limited to, phosphorus and/or arsenic. Suitable dopants for P-type regions include, but are not limited to, boron. A suitable concentration for the P-type dopant in a P-type doped region 50 includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region 50 includes, but is not limited to, concentrations greater than $1\times10^{11}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Electrical conductors 52 are each in contact with a different one of the doped regions 50. Suitable electrical conductors 52 include, but are not limited to, metals. The device can be used in conjunction with electronics that are in electrical communication with the electrical conductors 52. For instance, when the light-absorbing medium 32 includes a PIN junction, the electronics can apply a reverse bias across the PIN junction. When the light-absorbing medium 32 receives a light signal, an electrical current flows through the light-absorbing medium 32 indicating the receipt of the light signal.

The optical device can be constructed using fabrication technologies that are employing in the fabrication of integrated circuits, opto-electronic circuits, and/or optical devices. For instance, the ridge 22 for the waveguide 16 and/or the seed portion 34 can be formed in the light-transmitting medium 18 using etching technologies on a silicon-on-insulator wafer. Additionally or alternately, when the light-transmitting medium 18 is silicon and the coupler medium is amorphous or crystal silicon, the coupler medium can be deposited on the light-transmitting medium 18. Horizontal tapers can be readily formed using masking and etching technologies. Suitable methods for forming vertical tapers are disclosed in U.S. patent application Ser. No. 10/345,709, filed on Jan. 15, 2003, entitled "Controlled Selectivity Etch for Use with Optical Component Fabrication," and incorporated herein in its entirety. Additionally or alternately, when the light-transmitting medium 18 is silicon and the light-absorbing medium 32 is germanium, the germanium can be grown on the silicon.

Although FIG. 2A through FIG. 3B illustrate the top of the seed portion 34 of the light-transmitting medium 18 being above the trench 24, the trench 24 and the top of the seed portion 34 of the light-transmitting medium 18 can be at the same level.

There can be additional mediums over the optical devices illustrated in FIG. 1A through FIG. 3B. For instance, there can be one or more cladding layers over the waveguide 16, optical coupler 36 and/or light-absorbing medium 32. Examples of suitable cladding layers include, but are not limited to, silica.

Although FIG. 1A through FIG. 3B illustrate the optical coupler 36 and waveguide 16 as different pieces of the device, they need not be different pieces of the device. For instance, the transition from the waveguide 16 into the optical coupler 36 can be continuous without an interface between the optical coupler 36 and the waveguide 16. As an example, an the end of the waveguide 16 can be vertically tapered. The vertically tapered portion of the waveguide 16 can provide the end of the waveguide 16 with a shape that approximates the combined shape of the waveguide 16 and optical coupler 36 shown in FIG. 2A.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a waveguide on a base, the waveguide configured to guide a light signal through a light-transmitting medium,
the waveguide having a coupled portion and an uncoupled portion;
an optical coupler positioned on the coupled portion of the waveguide such that the waveguide is between the optical coupler and the base,
the optical coupler not being positioned on the uncoupled portion of the waveguide;
the optical coupler configured such that at least a portion of the light signal enters the optical coupler from the waveguide; and
a light sensor positioned on the base with the light-transmitting medium being between the light sensor and the base,
the light sensor including a light-absorbing medium configured to receive at least a portion of the light signal from the optical coupler,
the light-absorbing medium being different from the light-transmitting medium.

2. The device of claim 1, wherein and the coupled portion of the waveguide is between the light sensor and the uncoupled portion of the waveguide.

3. The device of claim 1, wherein the optical coupler includes a taper that is vertical relative to the base.

4. The device of claim 1, wherein the optical coupler includes a taper that is horizontal relative to the base.

5. The device of claim 1, wherein the optical coupler includes a multi-mode interference device.

6. The device of claim 1, wherein the light-absorbing medium is configured to receive the portion of the light signal directly from the optical coupler.

7. The device of claim 1, wherein
the waveguide includes a waveguide facet,
the optical coupler includes a coupler facet,
the light-absorbing medium includes a sensor facet, and
the waveguide facet is in contact with the sensor facet and the coupler facet is in contact with the sensor facet.

8. The device of claim 1, wherein the light signal-transmitting medium includes crystal silicon.

9. The device of claim 8, wherein a portion of the optical coupler which the light signal travels through includes amorphous silicon or crystal silicon.

10. The device of claim 9, wherein the light-absorbing medium is germanium.

11. The device of claim 10, wherein the portion of the optical coupler which the light signal travels through consists of amorphous silicon.

12. The device of claim 1, wherein the waveguide includes a waveguide facet through which the light signal exits the waveguide, the waveguide facet having a height that is below a height of an upper surface of the light-absorbing medium, wherein the heights are measured relative to the base.

13. The device of claim 12, wherein a portion of the light-transmitting medium extends from the waveguide facet into a space between the light-absorbing medium and the base.

14. The device of claim 1, wherein the light-transmitting medium and the optical coupler are constructed of different materials.

15. The device of claim 1, wherein the light-absorbing medium includes a first portion and a waveguide portion,
the first portion of the light-transmitting medium being between the light absorbing medium and the base and
the waveguide portion of the light-transmitting medium is continuous with the first portion of the light-transmitting medium.

* * * * *

UNITED STATES PATENT AND TRADEMARK OFFICE
CERTIFICATE OF CORRECTION

| | | |
|---|---|---|
| PATENT NO. | : 7,769,259 B1 | |
| APPLICATION NO. | : 12/291003 | |
| DATED | : August 3, 2010 | |
| INVENTOR(S) | : Po Dong and Dazeng Feng | |

It is certified that error appears in the above-identified patent and that said Letters Patent is hereby corrected as shown below:

In Column 1, immediately below the Title, please insert the following:
--This invention was made with Government support under Agreement No. HR0011-08-9-0001 awarded by DARPA. The Government has certain rights in this invention.--

Signed and Sealed this
Twenty-fourth Day of April, 2012

David J. Kappos
*Director of the United States Patent and Trademark Office*